United States Patent
Marcy

(10) Patent No.: US 6,662,342 B1
(45) Date of Patent: Dec. 9, 2003

(54) METHOD, SYSTEM, AND PROGRAM FOR PROVIDING ACCESS TO OBJECTS IN A DOCUMENT

(75) Inventor: Glenn A. Marcy, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,130

(22) Filed: Dec. 13, 1999

(51) Int. Cl.[7] .............................................. G06F 17/00
(52) U.S. Cl. ........................ 715/513; 715/500; 717/143
(58) Field of Search ............................. 715/500, 501.1, 715/513, 514, 515, 516; 707/101; 717/143; 341/90

(56) References Cited

U.S. PATENT DOCUMENTS

| | | | |
|---|---|---|---|
| 5,682,158 A | 10/1997 | Edberg et al. | |
| 5,724,593 A | 3/1998 | Hargrave, III et al. | |
| 5,732,270 A | 3/1998 | Foody et al. | |
| 5,758,314 A | 5/1998 | McKenna | |
| 5,778,213 A | 7/1998 | Shakib et al. | |
| 5,784,069 A | 7/1998 | Daniels et al. | |
| 5,784,071 A | 7/1998 | Tang et al. | |
| 5,787,452 A | 7/1998 | McKenna | |
| 5,793,381 A | 8/1998 | Edberg et al. | |
| 5,832,507 A | 11/1998 | Harper et al. | |
| 5,873,111 A | 2/1999 | Edberg | |
| 6,204,782 B1 * | 3/2001 | Gonzalez et al. | 341/90 |
| 6,226,675 B1 * | 5/2001 | Meltzer et al. | 709/223 |
| 6,408,311 B1 * | 6/2002 | Baisley et al. | 707/203 |
| 6,502,112 B1 * | 12/2002 | Baisley | 715/513 |
| 2003/0005410 A1 * | 1/2003 | Harless | 717/114 |
| 2003/0028561 A1 * | 2/2003 | Gounares et al. | 707/513 |

FOREIGN PATENT DOCUMENTS

WO   9710556   3/1997

OTHER PUBLICATIONS

XML Parser for Java, Frequently Asked Questions, posted Feb. 9, 1998, found online on Feb. 19, 2003 at http:www.alphaworks.ibm.com/aw.nsf/FAQs/xml4j.*

"XML Parser for Java", posted Feb. 9, 1998, found online on Feb. 19, 2003 at http://www.alphaworks.ibm.com/tech/xml4j.*

World Wide Web Consortium, Document Object Model (DOM Level 1 Specification W3C Recommendation Oct. 1, 1998, pp. 1–47.*

Min Zheng and Roy Rada, Text–Hypertext Mutual Conversion and Hypertext Interchange through SGML, Proceedings of the Second International Conference on Information and Knowledge Management (ACM: 1993), pp. 139–147.*

Sundsted, Todd; Java Makes the Most of XML; DeveloperWorks; [online] Jul. 1999 [retrieved on Jul. 19, 1999]; Retrieved from the Internet:<URL: http://review.software.ibm.com/developer/library/javaxml–howto>.

Johnson, Mark; XML for the Absolute Beginner; JavaWorld; [online] Apr. 1999 [retrieved on Nov. 27, 1999]; Retrieved from the Internet: <URL: http://javaworld.com/javaworld/jw–04–xml_p.html>.

* cited by examiner

*Primary Examiner*—Sanjiv Shah
*Assistant Examiner*—Charles A. Bieneman
(74) *Attorney, Agent, or Firm*—David W. Victor; Konrad Raynes Victor & Mann LLP

(57) ABSTRACT

Disclosed is a system, method, and program for determining a structure of objects in a document, such as an XML document. The document is parsed to determine instances of objects within the document. Each instance of each object is parsed to determine whether a value is provided for the object. Information is returned on each instance of each object in the document and location information is returned of the value for each object in the document having a value. The returned information identifies the objects in the documents and the location of any values for identified objects in the document. When the location information is returned, a string comprising the value from the document is not returned.

27 Claims, 5 Drawing Sheets

```
<xml version = "1.0">
<Catalog name = "pc-catalog">
    <Item type = "Desktop PC" id="92" serial="689923F007">
    <Description>
    For the office, the IBM OfficePro offers today's most sophisticated,
    cost-effective, industry standard technologies.
    </Description>
    <Specification>
        <Processor type="Pentium Pro" speed="200" unit="MHz"/>
        <Memory type="DIMM" size="5" unit="MB"/>
        <Diskdrive type="SCSI" size="5" unit="GB"/>
    </Specification>
    <Price value="2000" unit="US"/>
    </Item>

<Item>
        ...
    </Item>

<Item>
        ...
    </Item>

...

</Catalog>
```

METHOD, SYSTEM, AND PROGRAM FOR PROVIDING ACCESS TO OBJECTS IN A DOCUMENT

BACKGROUND OF THE INVENTION

1. Field of the Invention

The present invention relates to a method, system, and program for providing access to objects in a document, such as a well formed document.

2. Description of the Related Art

The Extensible Mark-up Language (XML), which is a subset of the Standard Generalized Markup Language (SGML), is designed to provide the capability to exchange structured documents over the Internet. XML files clearly mark where the start and end of each of the logical parts (called elements) of an interchanged document occur. For instance, if the XML document defines a book, the elements would include the table of contents, chapters, appendices, etc. The XML document includes a definition of each element in a formal model, known as a Document Type Definition (DTD). The DTD provides attributes for each element and indicates the relationship of the elements. Elements are arranged in a hierarchical relationship. The DTD would define the hierarchical relationship of the elements to one another and the attributes of the elements. Further details of XML are described in the publication "Extensible Markup Language (XML) 1.0, document no. REC-xml-19980210 (Copyright W3C, 1998), which publication is incorporated herein by reference in its entirety.

Users can encode and view an XML document with the Document Object Model (DOM) application program interface (API). The DOM interface is described in the publication entitled "Document Object Model (DOM) Level 1 Specification, Version 1.0," document no. REC-DOM-Level-1-19981001 (Copyright W3C 1998), which publication is incorporated herein by reference in its entirety. The DOM interface represents the document as a hierarchical arrangement of nodes. When applied to the XML document, each node comprises one of the elements or attributes of the elements. For instance, the user may define the DTD (1) below to include elements of a book.

```
<?xml version="1.0">

<Book title="The NetRexx Language">

<Contents> . . . </Contents>

<Chapter title="Background"> . . . </Chapter>

<Chapter title="Overview"> . . . </Chapter>

<Chapter title="Definition"> . . . </Chapter>

<Appendix> . . . </Appendix>

</Book>                                          (1)
```

The DOM interface would represent the above elements in the tree illustrated in FIG. 1. Rather than describing the order and fashion in which the data should be displayed, the tags indicate what each item of data means (whether it is a <title> element, an <author> element, and so forth.). Any receiver of this data can then decode the document, each using it for his own purposes. For example, a bookstore might use the information to fill an order, a market analyst might use many similar orders to discover which books are most popular, and an individual might file it as a record of his purchases.

XML Application Program Interfaces (APIs) used to parse the XML document generally fall into two categories: event-based and tree-based. An event-based API (such as SAX) uses callbacks to report parsing events to the application. The application deals with these events through customized event handlers. Events include the start and end of elements and characters. Unlike tree-based APIs, event-based APIs usually do not build in-memory tree representations of the XML documents. Therefore, in general, SAX is useful for applications that do not need to manipulate the XML tree, such as search operations, among others. To process an XML document, the programmer creates a class that implements interface org.xml.sax.DocumentHandler. The Parser object (that is, the object that implements org.xml.sax.Parser) reads the XML from its input source, calling the methods of the DocumentHandler when tags, input strings, and so on are recognized at the input. The SAX interface parses the XML file and executes particular actions whenever certain structures (like tags) appear in the input. The DOM API represents the XML document as a tree of nodes. A JAVA** (or other language) program returns a representation of the, file as a tree of objects.

The XML parser processes the XML document character-by-character, searching for particular tags that define the objects within the document. The XML parser or scanner will send a request to an XML reader requesting the current character being processed in the text. The XML reader, which is capable of processing the XML file using the file encoding, converts the character from the file encoding, which may be ASCII or some other language specific encoding, to Unicode. This conversion process may require the XML reader to convert the character from a one byte encoding to the Unicode two byte encoding. This character conversion operation requires processor resources to allocate additional memory for the Unicode encoding and perform the conversion. The XML parser then processes the returned Unicode characters to determine the object in the document being analyzed. From the returned information, a DOM XML parser builds the DOM tree by scanning and converting each character in the XML document from the file encoding to Unicode. During this process, the XML parser would return to the application all the characters of the document converted into Unicode, which the application may then maintain as objects.

There is a need in the art for an improved technique for scanning an XML file to provide the application program access to the structure of the document.

SUMMARY OF THE PREFERRED EMBODIMENTS

To overcome the limitations in the prior art described above, preferred embodiments disclose a method, system, and program for determining a structure of objects in a document. The document is parsed to determine instances of objects within the document. Each instance of each object is parsed to determine whether a value is provided for the object. Information is returned on each instance of each object in the document and location information is returned on a location of the value for each object in the document having a value. The returned information identifies the objects in the documents and the location of any values for identified objects in the document. When the location information is returned, a string comprising the value from the document is not returned.

In further embodiments, the objects include element objects having a name. When an element object has associated attribute objects, each attribute object comprises a name and value. The location information of the values indicates the location in the document of the attribute values.

In still further embodiments, for each object in the document, a handle addressing a name of each element and attribute object in the document is generated. In such case, the handle addressing the name of the object is returned when returning information for each object.

In yet further embodiments, the steps of parsing and returning information are performed by a parser. An application program determines one object to access having a value from the information returned from the parser and the location information of the value for the determined object. The application program then requests the parser to obtain a string of data comprising the value at the determined location information. The parser converts the requested string of data from a first encoding to a second encoding and returns the data in the second encoding to the application program.

Preferred embodiments provide a method, system, and program for providing an application program information on the structure of a document, such as an XML document. This structural information includes information on instances of objects in the document and location information on any values for the objects in the document. In this way, the application program is provided a definition of the document structure without having the parser convert the characters in the document from a document encoding to Unicode.

When providing information on the structure of the document, prior art parsers typically convert all the characters to Unicode, which requires substantial processor cycles to allocate the additional memory for the Unicode characters and to perform the conversion operations. These Unicode conversion operations can substantially degrade performance when processing especially large XML documents. Preferred embodiments provide a technique for providing an application program all the information needed to define the structure of objects in the document and access such objects without having to convert characters to Unicode. If the application program wants specific content within the document, then the application program can request the parser to return specific strings of content identified in the returned location information. At this point, when specific content is requested, the parser would convert the characters to the Unicode encoding.

Thus, preferred embodiments provide a method, system, and program for providing access to objects within a document without converting the content of the objects to a new encoding, such as Unicode.

BRIEF DESCRIPTION OF THE DRAWINGS

Referring now to the drawings in which like reference numbers represent corresponding parts throughout:

FIG. 4 illustrates an example of an XML document; and

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
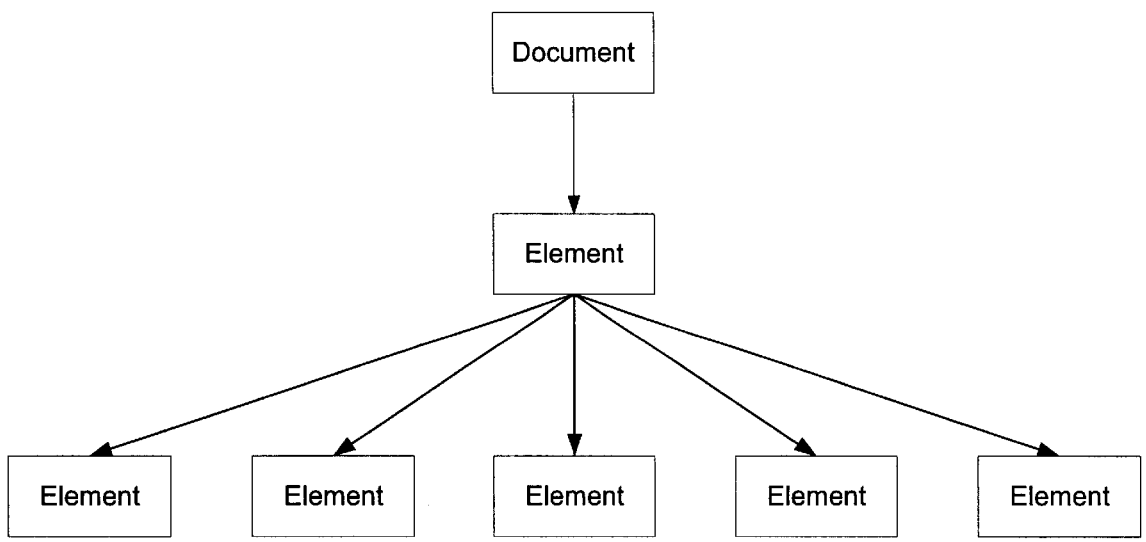
FIG. 1 is an illustration of a hierarchical tree structure of how current DOM API interfaces provide access to the elements of an SGML document.
Figure 2:
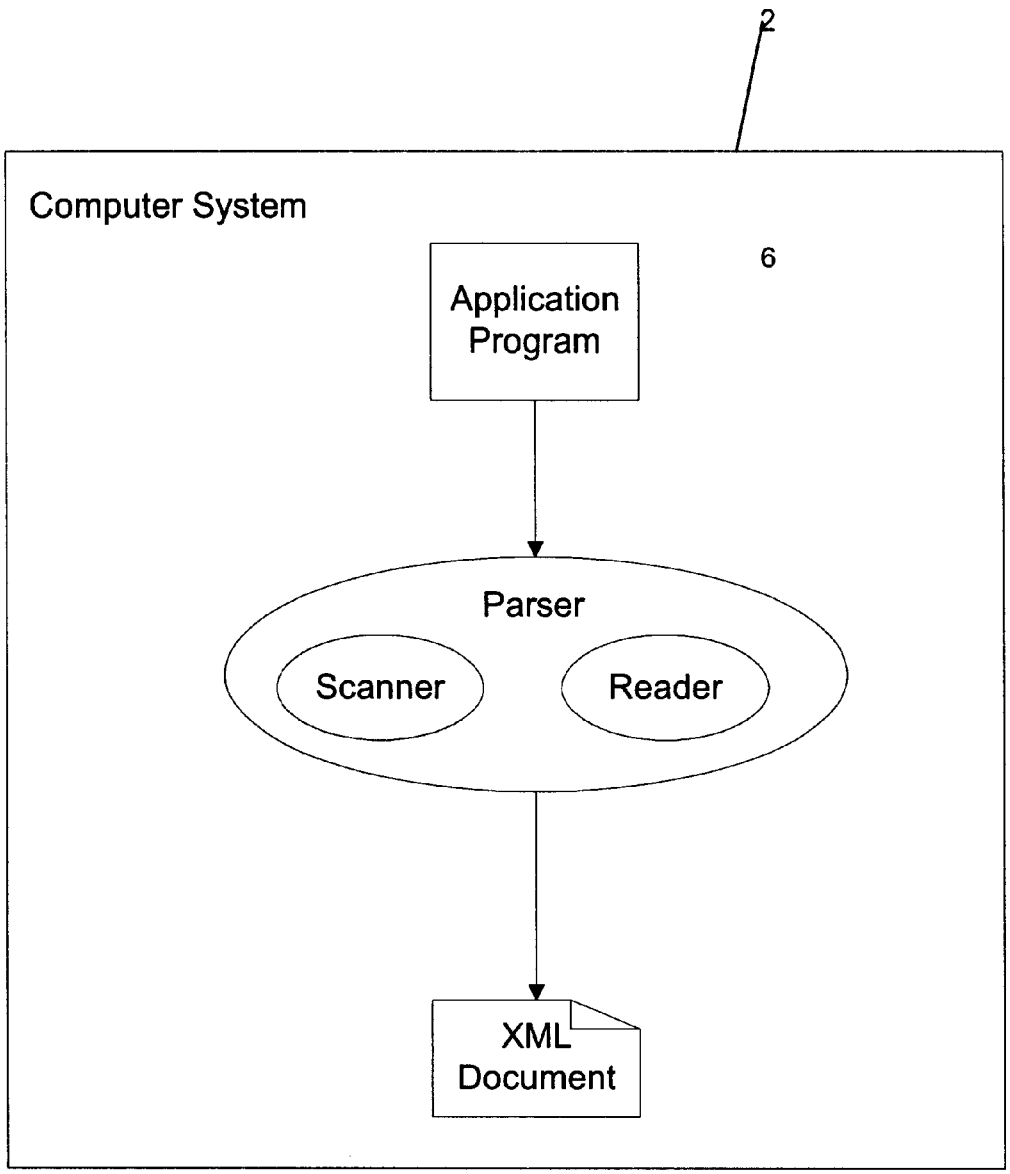
FIG. 2 illustrates an arrangement of program components in accordance with preferred embodiments of the present invention.

FIG. 2 illustrates the program elements in which preferred embodiments are implemented. A computer system 2, which may comprise any computer system known in the art including volatile and non-volatile memory areas, includes an XML document 4 and an application program 6 that wants to access the XML document, such as a DOM, search engine, or other application program. To access the XML document 4, the application program 6 calls the XML parser 8 interface to access the XML document 4 and pass character strings and other data to the application program 6. The XML parser 8 includes an XML scanner 10 to process the XML document 4. The XML scanner 10 stores the markup information in the storage pools. The XML parser 8 further includes an XML reader 12, which is used by the XML scanner 10 to process the XML document 4. The XML parser 8 may further check whether the use of tags is correct, i.e., whether the document is well formed, and validate the document, i.e., determine whether the use of elements conforms to their definition in the document type definition section.

Figure 3:
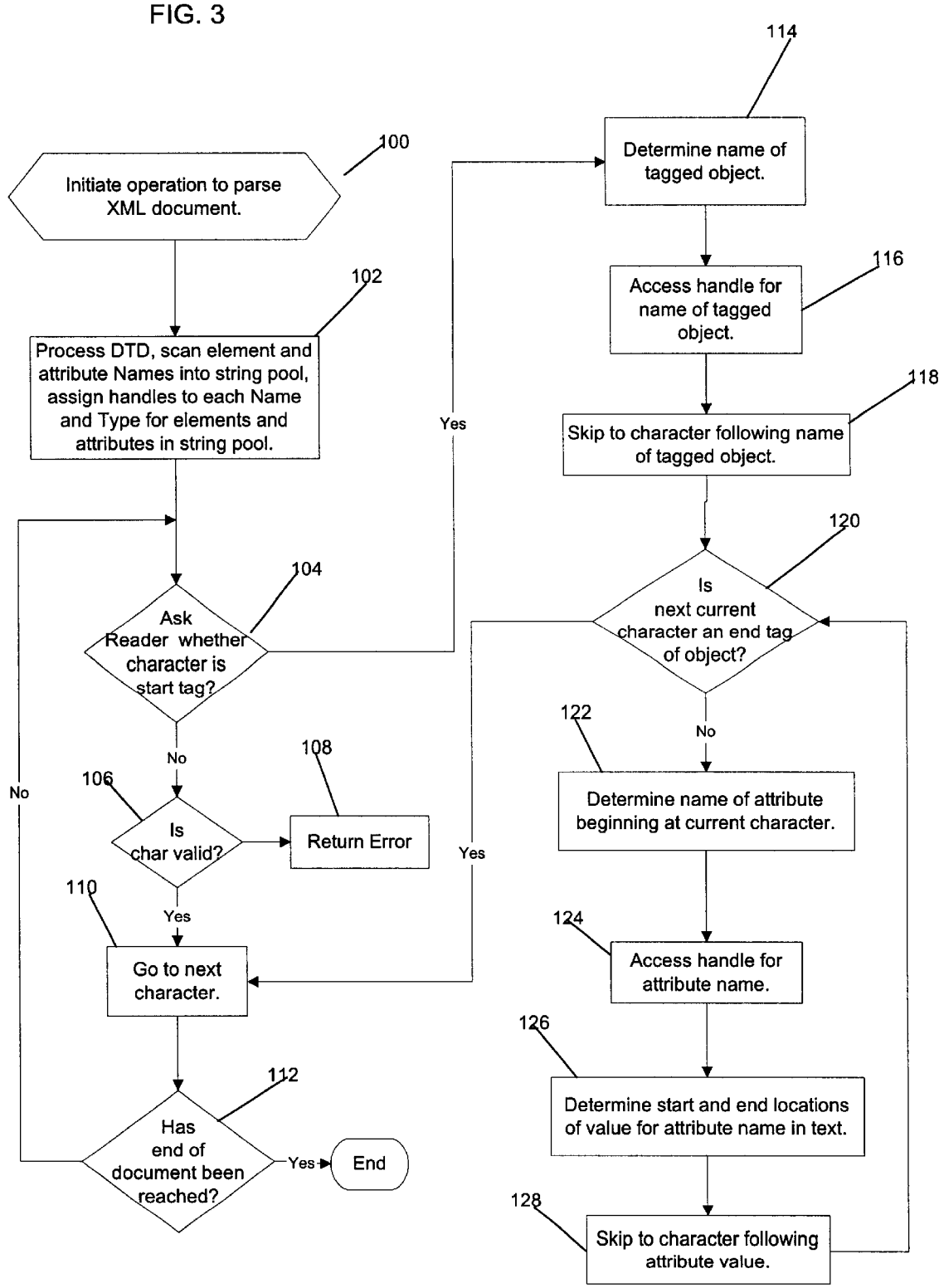
FIG. 3 illustrates logic implemented in a program component to transform elements to a program interface in accordance with preferred embodiments of the present invention.

FIG. 3 illustrates logic implemented in the XML parser 8, including the XML scanner 10 and XML Reader 12 components, to process the XML document 4 and return information on the document to the application program 6. The XML parser 8 would issue calls to the XML reader 12 to determine the structure of the document and instances of defined objects, such as elements and attributes, within the XML document 4. Elements do not have to have associated attributes. At block 100, the application program 6 initiates a call to the XML parser 8 to parse the XML document 4. Upon first processing the document, the XML parser 8 would process (at block 102) the prolong of comments including document type definitions (DTD) defining the objects, e.g., elements and attributes, their interrelationship (e.g., hierarchical relationship of the objects), and the grammar for the elements. The XML parser 8 returns information on the document structure to the application program 6 to use. When scanning the document type definition (DTD), the XML parser 8 would further add the name defined for the elements and any attributes or properties of the elements to a string pool and assign a numeric handle to each of the strings added to the string pool in the memory of the computer system 2. This allows the application program 6 to use a handle to refer to often repeated element and attribute names. As discussed, the elements may not have associated attributes. At an appropriate instance, the XML parser 8 calls (at block 104) the XML reader 12 and asks whether the current character position is a start tag, which in XML comprises a "<". The first tagged object should be the highest level element defined in the document type definition (DTD). Other tag information may be specified such as relation tags defining the hierarchical relations of elements. Note that the XML Reader 12 does not need to convert the character to Unicode at this point and only needs to respond to the question posed by the method requesting whether the character is start a tag. If the character is not a start tag, then the XML parser 8 determines (at block 106) whether this character is valid according to rules of the document defined in the document type definition or in conformance with the XML language in a manner known in then art. If the character is not valid, then an error code is returned (at block 108). Otherwise, the XML reader 12 skips (at block 110) to the next character. If the end of the document has been reached (at block 112), then the program ends. Otherwise, control proceeds back to block 104 to consider the next character.

If the character is a start tag (at block 104), then the XML parser 8 scans (at block 114) the name of the tagged object and accesses (at block 116) the handle for the name of the tagged object. All information about the document is returned to the application program 6. The XML parser 8 then calls the XML Reader 12 to skip (at block 118) to the character following the name of the tagged object, which would require skipping a white space following the named of a tagged object. If this next current character is an end tag for the object (at block 120), then control proceeds back to block 110 to consider the next character in the XML document 4. Otherwise, the next string of characters followed by a whitespace must be an attribute of the tagged object. In such case, the XML parser 8 determines (at block 122) the name of the attribute beginning at the current character by scanning the characters from the current character to the whitespace. The XML parser 8 then accesses (at block 124) the handle pointing to the attribute name in the storage pool to return to the application program 6. The XML parser 8 further issues calls to the XML reader 12 to determine (at block 126) the start and end locations of the value in the text for the determined attribute, which would typically follow an equal sign "=" following the attribute name. This location information is returned to the application program 6. The XML parser 8 then instructs the XML reader 12 to skip (at block 128) to the character following the attribute value. Control proceeds back to block 120 to consider this next character.

FIG. 4 illustrates an example of an XML document 150 defining a catalog including as elements personal computer (PC) products. The root node is the "catalog name" that has as an attribute a name. Element Item is a subelement of the catalog element, that has as attributes "type", "id", "subtype", and "serial". Each Item element includes as child elements "description", "specification", and "price". Specification is an element that has as attributes "processor", "memory", and "diskdrive". Further subelements of the Specification element include: Processor having attributes "type", "speed", and "unit"; Memory having attributes "type," "size", and "unit"; diskdrive having attributes "type," "size", and "unit"; and price having properties "value" and "unit."

Using the logic of FIG. 3, the XML parser 8 provides the application program 6 information on all tagged objects in the document. The application program 6 can use this information to define the structure of the document as nodes for each Item in the catalog that would include as children the attributes of the Item, type, id, serial, and the elements description, specification, and price value. The specification element includes further children nodes processor, memory, and disk drive, which each include attributes. The XML parser 8 further provides the application program 6 the location information for the values of any attributes defined within the XML document 4. The application program 6 may then associate with each node the returned attribute value location information. Further, the XML parser 8 may assign handles to the attributes of the elements, e.g., item type, item id, serial, processor type, speed, unit (MHz), memory type, memory size, memory unit (MB), disk drive type, disk drive size, disk drive unit (GB), price value, and price unit ($US). The XML parser 8 would return the handle pointers to the application program 6 when providing information on the name of attributes in the XML document 4. In this way, the application program 6 may define the XML document as a hierarchy of nodes for each element and attribute. These nodes include a handle pointer to the name of the object, e.g., element or attribute, defined at the node. If the node defines an attribute, then the node would further include attribute value location information providing the location of the value for the attribute in the XML document 4. The application program 6 may ascertain hierarchical relationships of objects from the prolong section and document type definition (DTD) or from tagged relation objects within the XML document.

Figure 5:
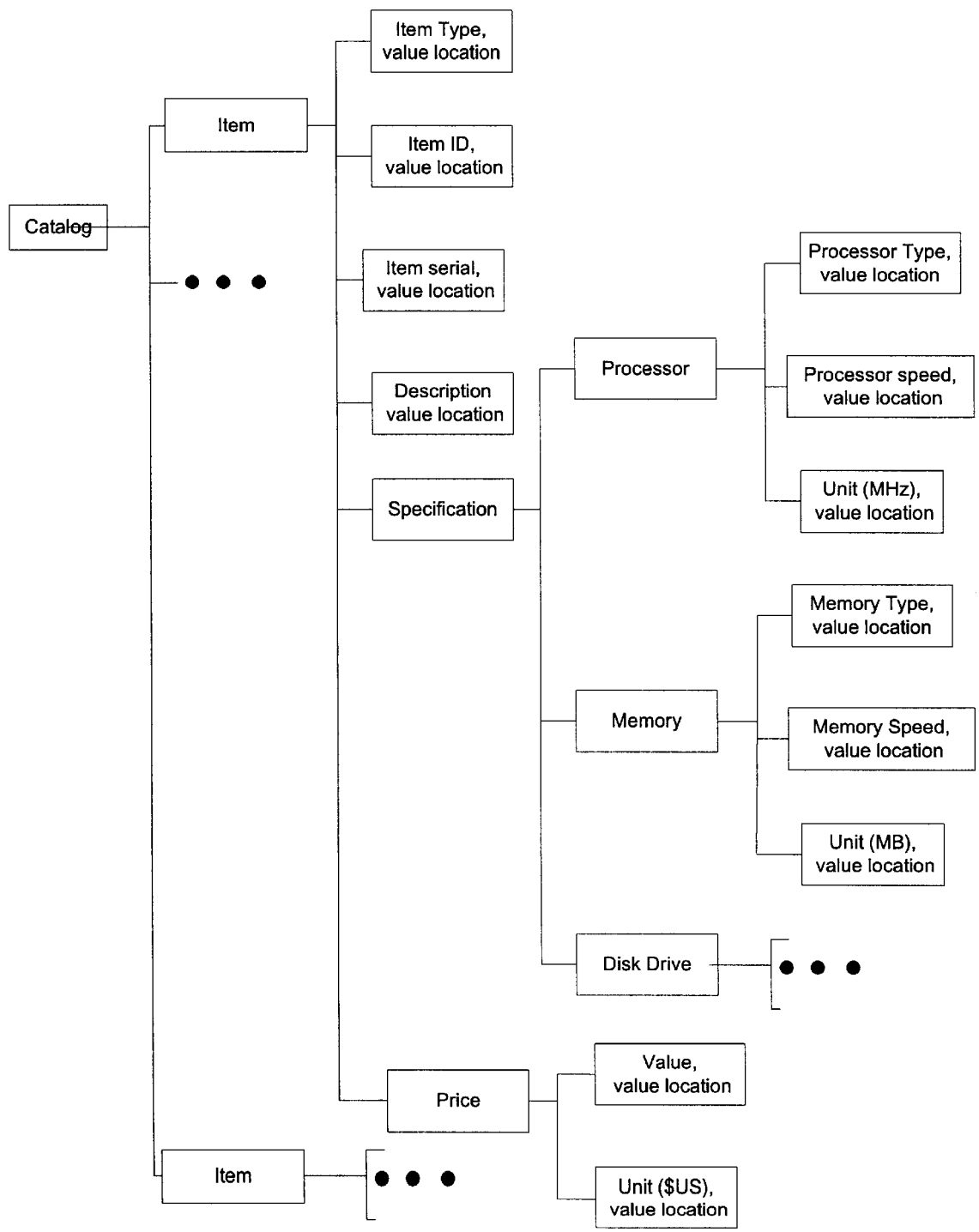
FIG. 5 illustrates how the objects in the XML document in FIG. 4 may be mapped to nodes of a tree in accordance with preferred embodiments of the present invention.

FIG. 5 illustrates a hierarchical representation of the nodes defining the document in FIG. 4. A node is provided for each element and attribute. For each attribute, value location information is provided indicating the location in the document of the value. The XML parser may provide handles for the element and attribute names shown at the nodes in FIG. 5.

Once this information on the structure is obtained for all nodes or any particular node, then the application program 6 can obtain information and content on any part of the document because the structure and the location in the XML document 4 of values for attributes are known. To obtain the value of a particular part of the XML document, the application program 6 would issue a request to the XML parser 6, which would then call the XML reader 12 to read the value from the document at the location indicated in the location information and convert the value to a Unicode string to return to the application program 6.

A DOM parser may utilize the logic of FIG. 3 to obtain the structure and arrangement of the nodes implementing the elements and attributes for the nodes. A SAX parser may utilize the logic of FIG. 3 to obtain object, e.g., element and/or attribute information, upon the occurrence of a particular event and pass the object information, including a handle for the name of the element, attributes of the element, and location information on the value of attributes to the application program 6.

The preferred method for parsing the XML document to determine the structure of the objects requires substantially less processor and memory resources than current parsing methods. As discussed, in the prior art, the XML parser converts every character to Unicode and allocates space in memory for the converted Unicode data. The prior art XML processor would create objects in memory for the entire converted document when providing the application program 6 information on the structure of the XML document. If the XML document is in a one byte encoding, such as ASCII, then the conversion to Unicode, which requires 2 bytes, would double the memory allocation to the file and require full conversion of the document even though the application program 6 may initially only need the base structure without the content or values of all the elements and attributes.

Preferred embodiments avoid having to allocate memory for converting the characters in the XML document 4 to Unicode because the XML parser 8 of the preferred embodiments returns handles for attribute and element names that point to strings in the storage pool and location offsets of attribute values within the document. Moreover, handles may be used to provide a pointer to a commonly used attribute values or list of values. In this way, the XML parser 8 would return the handle to the value instead of the actual value itself. The use of integer handles further reduces the information the application program 6 needs to maintain to represent the structure of the document. Instead of maintaining numerous instances of the same name, type and/or value, only a single integer handle is maintained, which typically uses less bits than used by the actual characters for the name, type or value.

The preferred embodiments provide a fast processing technique that minimizes use of processor and memory resources to provide the application program 6 the structure of the XML document 4 including location information to allow the application program 6 to access the actual data for any of the objects of the XML document, e.g., elements and attributes. With the preferred embodiments, only a minimal amount of information is needed to define the document structure to the application program 6. If the application program 6 wants any further document data, then it would use the element information and offsets to locate a specific section of the XML document including It has been noticed that products implementing the preferred embodiment logic, such as the IBM XML4J EA2 parser, can process large documents to determine the structure substantially faster then current XML parser techniques. For instance, it has been noticed that the current XML4J EA2 can process an approximately 10MB XML document twice as fast as current XML parsers. Preferred embodiments improve processing speed by avoiding having to allocate objects in memory for the conversion of the entire XML document to Unicode.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments described generating a method to access elements within a document arranged in a hierarchical fashion. However, in alternative embodiments, the elements do not have to be in a hierarchical relationship to one another and may be accessible through interfaces other than the DOM interface.

Preferred embodiments of the document and parser were described as implemented for XML documents. However, the logic for parsing and defining the structure of the XML documents may apply to compiling other document types known in the art, such as Dynamic Hypertext Mark-Up Language (DHTML), Cascading Style Sheets, any other Standard Generalized Markup Language (SGML), or any other language known in the art for creating interchangeable, structured documents. In yet further embodiments, the requested file may be in any other file format, i.e., other than an SGML type format, capable of being displayed or otherwise executed by the requesting client.

The program interface of the preferred embodiments that provides direct access to elements in the XML document is implemented in JAVA** methods. However, any other program calls or interfaces could be used to implement the controls that provide direct access to the elements in the document to allow the user to more readily and directly manipulate the elements in the document.

Preferred embodiments described particular methods that could be generated for each class of elements. However, the default methods generated may include any methods that could be used to manipulate or otherwise affect the elements in the XML document.

Preferred embodiments were described with respect to providing information on elements and attributes within an XML document. However, the preferred method for compiling and obtaining structural information on the document may apply to any objects within the document, not just elements and attributes.

Although the logic of the preferred embodiments is implemented in the IBM XML parser XML4J EA2, the preferred logic may be implemented in any XML parser to increase processing speed and reduce memory usage during the initial rendering of the document structure.

In summary, preferred embodiments disclose a method, system, and program for determining a structure of objects in a document. The document is parsed to determine instances of objects within the document. Each instance of each object is parsed to determine whether a value is provided for the object. Information is returned on each instance of each object in the document and location information is returned of the value for each object in the document having a value. The returned information identifies the objects in the documents and the location of any values for identified objects in the document. When the location information is returned, a string comprising the value from the document is not returned.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

JAVA and all JAVA-based trademarks are trademarks of Sun Microsystems, Inc. in the United States, other countries, or both.

What is claimed is:

1. A method for determining a structure of objects in a document, comprising:

while scanning a document type declaration in the document, generating a handle addressing each different object name in memory, wherein there are one or more instances of each different object name in the document, and wherein the handle for an object name is used for each instance of the object having that object name in the document;

parsing the document to determine instances of objects within the document;

parsing each instance of each object to determine whether a value is provided for the object;

returning information on each instance of each object in the document by returning the handle addressing the object name of the object; and returning location information of the value for each object in the document having a value, wherein the returned information identifies the objects in the documents and the location of any values for identified objects in the document without returning a string comprising the value from the document.

2. The method of claim 1, further comprising returning information on a hierarchical relationship of objects in the document.

3. The method of claim 1, wherein the objects include element objects having a name.

4. The method of claim 3, wherein at least one element object has associated attribute objects, wherein each attribute object comprises a name and value, wherein the location information of the values indicates the location in the document of the attribute values.

5. The method of claim 1, wherein the document is a well formed document, further comprising:

parsing the document type declaration identifying the objects within the document and the hierarchical relationship of the objects within the document; and returning information on the hierarchical relationship of the document.

6. The method of claim 5, wherein the steps of parsing and returning information are performed by a parser, further comprising, performing with an application program:

generating a node for each object indicated in the returned information, wherein the generated nodes are defined according to the hierarchical relationship included in the returned information; and associating with each node generated for an object having a value the returned location information of the location of the value in the document.

7. The method of claim 1, wherein the steps of parsing and returning information are performed by a parser, further comprising, performing with an application program:

determining one object to access having a value from returned information from the parser;

determining the location information of the value for the determined object; and requesting the parser to obtain a string of data comprising the value at the location defined in the determined location information, wherein the parser converts the requested string of data from a first encoding to a second encoding and returns the data in the second encoding to the application program.

8. The method of claim 1, wherein parsing the document and instances of objects in the document are performed by a parser communicating with a reader, further comprising:

requesting, with the parser, whether a character indicates the start of an instance of one object in the document;

returning a boolean response, with the reader, indicating whether the character indicates the start of an object instance in the document;

requesting, with the parser, information on the instance of the object if the returned boolean response indicates that the character indicates the start of an object instance, wherein the reader returns a name of the object instance and any attributes thereof, and location information of values for any attributes of the object instance in the document.

9. The method of claim 8, wherein the parser can determine the instances of each object in the document and location information of values for each object having values without having the reader allocate additional space in memory to convert characters in the document from a first encoding to a second encoding.

10. A system for determining a structure of objects in a document, comprising:

means for, while scanning a document type declaration in the document, generating a handle addressing a each different object name in memory, wherein there are one or more instances of each different object name in the document, and wherein the handle for an object name is used for each instance of the object having that object name in the document;

means for parsing the document to determine instances of objects within the document;

means for parsing each instance of each object to determine whether a value is provided for the object;

means for returning information on each instance of each object in the document by returning the handle addressing the object name of the object; and means for returning location information of the value for each object in the document having a value, wherein the returned information identifies the objects in the documents and the location of any values for identified objects in the document without returning a string comprising the value from the document.

11. The system of claim 10, further comprising means for returning information on a hierarchical relationship of objects in the document.

12. The system of claim 10, wherein the objects include element objects having a name.

13. The system of claim 12, wherein at least one element object has associated attribute objects, wherein each attribute object comprises a name and value, wherein the location information of the values indicates the location in the document of the attribute values.

14. The system of claim 10, wherein the document is a well formed document, further comprising:

means for parsing the document type declaration identifying the objects within the document and the hierarchical relationship of the objects within the document; and means for returning information on the hierarchical relationship of the document.

15. The system of claim 14, wherein the means for parsing and returning information are performed by a parser, further comprising an application program comprising:

means for generating a node for each object indicated in the returned information, wherein the generated nodes are defined according to the hierarchical relationship included in the returned information; and means for associating with each node generated for an object having a value the returned location information of the location of the value in the document.

16. The system of claim 10, wherein the means for parsing and returning information are performed by a parser, further comprising an application program comprising:

means for determining one object to access having a value from returned information from the parser;

means for determining the location information of the value for the determined object; and means for requesting the parser to obtain a string of data comprising the value at the location defined in the determined location information, wherein the parser converts the requested string of data from a first encoding to a second encoding and returns the data in the second encoding to the application program.

17. The system of claim 10, wherein the means for parsing the document and instances of objects in the document are performed by a parser communicating with a reader, further comprising:

means, performed by the parser, for requesting whether a character indicates the start of an instance of one object in the document;

means, performed by the reader, for returning a boolean response indicating whether the character indicates the start of an object instance in the document;

means for requesting, with the parser, information on the instance of the object if the returned boolean response indicates that the character indicates the start of an object instance, wherein the reader returns a name of the object instance and any attributes thereof, and location information of values for any attributes of the object instance in the document.

18. The system of claim 17, wherein the parser includes means for determining the instances of each object in the document and location information of values for each object having values without having the reader allocate additional space in memory to convert characters in the document from a first encoding to a second encoding.

19. An article of manufacture for use in determining a structure of objects in a document, the article of manufacture comprising computer usable media including at least one computer program embedded therein that causes the computer to perform:

while scanning a document type declaration in the document, generating a handle addressing a each different object name in memory, wherein there are one or more instances of each different object name in the document, and wherein the handle for an object name is used for each instance of the object having that object name in the document;

parsing the document to determine instances of objects within the document;

parsing each instance of each object to determine whether a value is provided for the object;

returning information on each instance of each object in the document by returning the handle addressing the object name of the object; and returning location information of the value for each object in the document having a value, wherein the returned information identifies the objects in the documents and the location of any values for identified objects in the document without returning a string comprising the value from the document.

20. The article of manufacture of claim 19, further comprising returning information on a hierarchical relationship of objects in the document.

21. The article of manufacture of claim 19, wherein the objects include element objects having a name.

22. The article of manufacture of claim 21, wherein at least one element object has associated attribute objects, wherein each attribute object comprises a name and value, wherein the location information of the values indicates the location in the document of the attribute values.

23. The article of manufacture of claim 19, wherein the document is a well formed document, further comprising:

parsing the document type declaration identifying the objects within the document and the hierarchical relationship of the objects within the document; and returning information on the hierarchical relationship of the document.

24. The article of manufacture of claim 23, wherein the steps of parsing and returning information are performed by a parser, further comprising, performing with an application program:

generating a node for each object indicated in the returned information, wherein the generated nodes are defined according to the hierarchical relationship included in the returned information; and associating with each node generated for an object having a value the returned location information of the location of the value in the document.

25. The article of manufacture of claim 19, wherein the steps of parsing and returning information are performed by a parser, farther comprising, performing with an application program:

determining one object to access having a value from returned information from the parser;

determining the location information of the value for the determined object; and requesting the parser to obtain a string of data comprising the value at the location defined in the determined location information, wherein the parser converts the requested string of data from a first encoding to a second encoding and returns the data in the second encoding to the application program.

26. The article of manufacture of claim 19, wherein parsing the document and instances of objects in the document are performed by a parser communicating with a reader, farther comprising:

requesting, with the parser, whether a character indicates the start of an instance of one object in the document;

returning a boolean response, with the reader, indicating whether the character indicates the start of an object instance in the document;

requesting, with the parser, information on the instance of the object if the returned boolean response indicates that the character indicates the start of am object instance, wherein the reader returns a name of the object instance and any attributes thereof, and location information of values for any attributes of the object instance in the document.

27. The article of manufacture of claim 26, wherein the parser can determine the instances of each object in the document and location information of values for each object having values without having the reader allocate additional space in memory to convert characters in the document from a first encoding to a second encoding.

* * * * *

UNITED STATES PATENT AND TRADEMARK OFFICE
CERTIFICATE OF CORRECTION

PATENT NO.     : 6,662,342 B1
DATED          : December 9, 2003
INVENTOR(S)    : Glenn A. Marcy It is certified that error appears in the above-identified patent and that said Letters Patent is hereby corrected as shown below:

Column 10,
Line 20, please delete "a each" and insert -- each --.

Column 11,
Line 44, please delete "a each" and insert -- each --.

Column 12,
Line 46, please delete "farther" and insert -- further --.
Line 54, please delete "am" and insert -- an --.

Signed and Sealed this

Twenty-second Day of June, 2004

JON W. DUDAS
*Acting Director of the United States Patent and Trademark Office*